United States Patent [19]
Murphy et al.

[11] 4,394,034
[45] Jul. 19, 1983

[54] BELT CLAMP FOR RETRACTOR

[75] Inventors: James E. Murphy, Royal Oak; Kenneth H. Reid, Mt. Clemens, both of Mich.

[73] Assignee: General Motors Corporation, Detroit, Mich.

[21] Appl. No.: 252,028

[22] Filed: Apr. 8, 1981

[51] Int. Cl.³ .............................................. B60R 21/10
[52] U.S. Cl. ................................... 280/801; 280/803; 280/806; 280/808; 242/107.2; 242/107.4 A; 297/476; 297/478; 297/480
[58] Field of Search ............... 280/801, 802, 803, 804, 280/806, 807, 808; 242/107.2; 297/476, 478, 480

[56] References Cited

U.S. PATENT DOCUMENTS

| | | | |
|---|---|---|---|
| 3,205,004 | 9/1965 | Spouge | 242/107.2 |
| 3,911,535 | 10/1975 | Mauron | 24/170 |
| 4,130,253 | 12/1978 | Yasumatsu | 280/808 |
| 4,149,737 | 4/1979 | Magyar | 280/807 |
| 4,163,530 | 8/1979 | Kondo | 242/107.1 |
| 4,211,377 | 7/1980 | Yasumatsu | 242/107.4 A |
| 4,273,301 | 6/1981 | Frankila | 280/806 |
| 4,300,731 | 11/1981 | Kondziola | 242/107.2 |
| 4,310,176 | 1/1982 | Furusawa et al. | 280/801 |
| 4,343,488 | 8/1982 | Stephenson | 280/802 |

FOREIGN PATENT DOCUMENTS 1508853  4/1978  United Kingdom .

Primary Examiner—Robert R. Song
Assistant Examiner—Dennis Pedder
Attorney, Agent, or Firm—Charles E. Leahy

[57] ABSTRACT

A belt clamping mechanism for a seat belt retractor having a belt reel rotatably journaled on a frame and a locking means for locking the reel against unwinding rotation. The retractor frame is mounted on the vehicle body for limited movement in the direction of belt pull. A yieldable device such as a frangible member acts between the frame and the vehicle body to establish the frame at a normal position in which a belt clamping member carried by the retractor frame is spaced from a clamping abutment mounted on the vehicle body. When the reel is locked and an occupant restraint load is imposed on the belt, the yieldable device permits movement of the reel and the frame in the direction of belt pull so that the belt is clamped between the clamping member carried by the frame and the clamping abutment mounted on the vehicle body to fix the belt length against spooling down on the reel.

3 Claims, 4 Drawing Figures

BELT CLAMP FOR RETRACTOR

The invention relates to a seat belt retractor and more particularly provides a belt clamping mechanism actuated by reel movement induced by imposition of belt load to prevent spool-down of belt wound upon the reel.

BACKGROUND OF THE INVENTION

It is well known to provide a passive seat belt system wherein one end of the belt is mounted inboard the seat and the outboard belt end is mounted on the door. A retractor is provided at one of the belt ends so that the belt is automatically wound and unwound between restraining and nonrestraining positions by the swinging movement of the door.

It is characteristic of such passive belt system that many layers of belt are wound upon the retractor reel when the door is closed and the belt assumes the restraining position. It has been observed in the prior art that the imposition of an occupant restraint load upon the belt subsequent to locking of the reel by a vehicle sensitive inertia locking mechanism causes the belt to tighten or spool-down on the reel and thereby extend the effective length of the restraint belt.

It is also known to employ a single reel mounted on the door for winding both the lap and shoulder belts. The simultaneous storage of both lap and shoulder belts on a single reel results in a relatively large diameter of belt wound upon the reel and accordingly increases the tendency for the belt to tighten or spool-down on the reel after the reel is locked by the onset of a sensed inertia condition.

The present invention provides a new and improved belt clamping mechanism in which the imposition of belt load on the reel subsequent to lockup of the reel against rotation induces shifting movement of the reel in the direction of belt pull to actuate a belt clamping mechanism.

SUMMARY OF THE INVENTION

According to the present invention a belt reel is rotatably journaled on a frame which is mounted for limited movement on the vehicle body. An inertia responsive locking means acts between the frame and the reel to selectively lock the reel against belt unwinding rotation so that restraint of the seat occupant imposes a load on the reel and the frame tending to move the frame in the direction of belt pull. A belt clamping member is carried by the frame for limited movement therewith to clamp the belt against a clamping abutment mounted on the vehicle body. A yieldable means acts between the frame and the vehicle body to establish the frame at a normal position spacing the clamping member from the clamping abutment to permit travel of the belt therebetween during normal belt winding and unwinding. The yieldable means yields upon the occurrence of an occupant restraint load on the belt subsequent to locking of the reel to permit the reel and the frame to move relative the vehicle body in the direction of belt loading and thereby effect clamping of the belt between the clamping member and the clamping abutment to fix the length of the belt against spooling down on the reel.

The feature, object and advantage of the invention resides in the provision of a mechanism for clamping a belt between a clamping abutment fixed on the vehicle body and a clamping member movable with the belt reel in the direction of belt pull upon reel lockup and belt load imposition to clamp the belt between the clamping abutment and clamping member.

A further feature, object and advantage of the invention resides in the provision of a belt reel having both a lap belt and shoulder belt wound thereon and mounted on a frame movable relative the vehicle body, said frame carrying a wedge-shaped belt clamping member interposed between the lap and shoulder belt strands exiting the reel so that limited bodily movement of the reel and frame in the direction of belt pull causes the belt clamping member to clamp the lap and shoulder belts against mating clamping surfaces of a belt clamping abutment fixedly mounted on the vehicle body.

These and other objects, features and advantages of the invention will become apparent upon consideration of the specification and the appended drawings in which.

Figure 3:
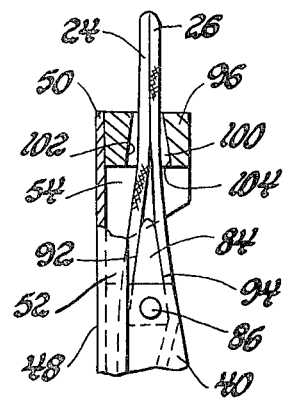
Figure 2:
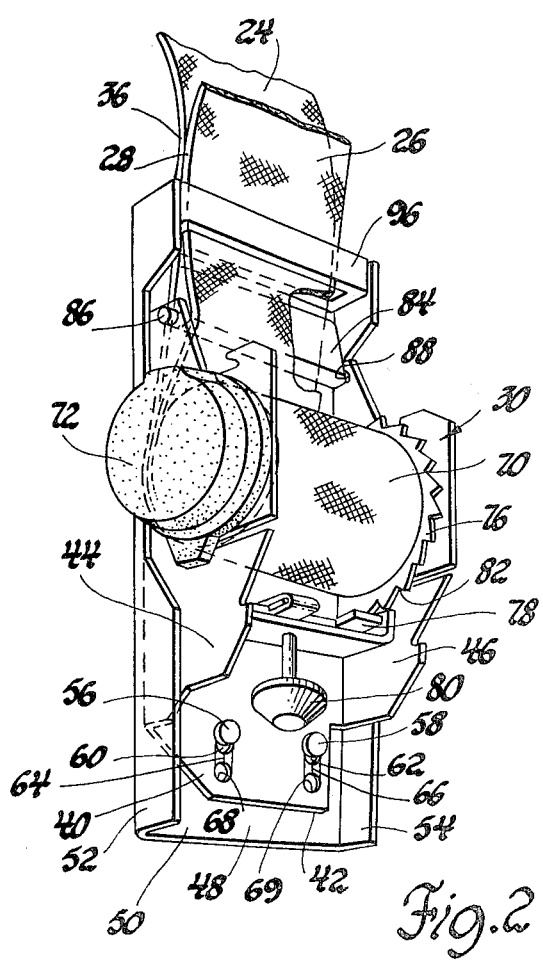
FIG. 2 is a perspective view of the seat belt retractor of the invention shown with the reel unlocked for belt winding and unwinding rotation and the belt clamping member spaced away from the belt clamping abutment.
Figure 4:
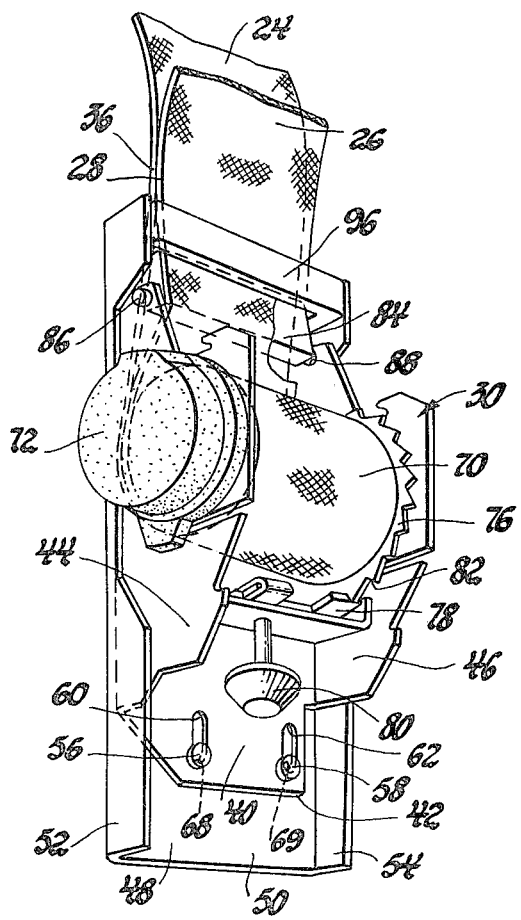

FIG. 3 is a fragmentary side elevation view corresponding to FIG. 2 and showing the belt clamping member spaced away from the belt clamping abutment; and FIG. 4 is a view similar to FIG. 2 but showing the reel locked against belt unwinding rotation and resultant limited bodily movement of the reel and frame by the belt load to carry the belt clamping member toward the clamping abutment to clamp the lap and shoulder belts.

DESCRIPTION OF THE PREFERRED EMBODIMENT

Figure 1:
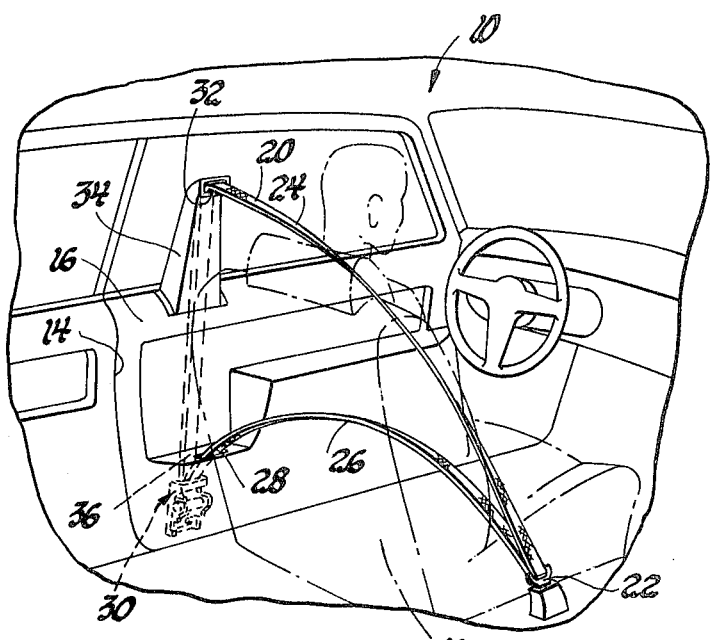
FIG. 1 is a perspective view showing a belt system having a seat belt retractor according to the invention.

Referring to FIG. 1, there is shown a vehicle body 10 having a seat 12 located laterally adjacent a door opening 14. A door 16 is hingedly mounted on the vehicle body 10 for swinging movement between a closed position shown in FIG. 1 and an open position.

A three-point continuous-loop passive occupant restraint system for restraining an occupant in the seat 12 includes a continuous-loop belt 20 slidable through a ring 22 anchored inboard the seat 12 to divide the belt 20 into a shoulder belt 24 and a lap belt 26. The lap belt 26 passes across the lower torso of the seated occupant and has an end 28 which is wound and unwound by a retractor 30 mounted on the lower rear corner of the door. The shoulder belt 24 is disposed diagonally across the upper torso of the occupant and is slidable through an anchor loop 32 which is supported adjacent the occupant outboard shoulder by a support 34 cantilevered upwardly from the door 16. The end 36 of the shoulder belt 24 is also wound and unwound by the retractor 30. The lap and shoulder belts are unwound from the retractor 30 as the door opens so that the belts swing more generally forward with the door to permit occupant ingress and egress.

Referring to FIG. 2, it is seen that the retractor 30 includes a stamped steel frame 40 including a base 42 and laterally spaced frame walls 44 and 46. The frame 40 is mounted on the lower rear corner of the door 16 by a housing 48 which includes a base 50 suitably welded or otherwise attached to the door and a pair of laterally spaced walls 52 and 54 which slidably engage the frame walls 44 and 46. The frame 40 is mounted on the housing 48 by a pair of headed studs 56 and 58 which project through elongated slots 60 and 62 provided in the frame base 42. Frangible webs 64 and 66 are defined in the base 42 and separate the elongated slots 60 and 62 from apertures 68 and 69.

A conventional belt reel 70 includes a reel shaft, not shown, journaled for rotation on the frame walls 44 and 46. Both the shoulder belt 24 and the lap belt 26 have their respective ends 36 and 28 attached to the reel shaft so that the belts are simultaneously wound one upon the other during belt winding rotation of the reel 70 by a winding spring concealed beneath a spring cover 72. A ratchet plate 76 is attached to the end of the reel 70. A lock bar 78 is pivotally mounted on the frame walls 44 and 46 and is pivoted upwardly by a pendulum 80 to engage ratchet teeth 82 provided on the ratchet plate 76.

A clamping member 84 is pivotally mounted on the frame walls 44 and 46 by pivot portions 86 and 88 thereof which extend through apertures of the walls 44 and 46. As best seen in FIG. 3, the clamping member 84 is wedge-shaped and has belt clamping surfaces 92 and 94 on the angularly disposed opposite facing sides thereof. An annular clamping abutment 96 is attached to the housing walls 52 and 54 and including angularly disposed clamping surfaces 102 and 104 which define a belt passage 100. As best seen in FIG. 3, the shoulder belt 24 and the lap belt 26 pass on opposite sides of the clamping member 84 and extend through the passage 100 of the clamping abutment 96.

Referring again to FIGS. 2 and 3, it is seen that the normal vertical position of the retractor frame 40 relative the housing 48 is established by the headed studs 56 and 58 which extend through the slots 60 and 62 of the frame 40. As best seen in FIG. 3, this normal vertical position of the retractor frame 40 establishes the clamping member 84 at a normal spaced relation from the clamping abutment 96 so that the shoulder belt 24 and lap belt 26 slide with relative ease around the clamping member 84 and through the passage 100 during belt winding and unwinding rotation of the reel 70.

Referring to FIG. 4, it will be understood that the onset of a vehicle deceleration condition of predetermined magnitude will tilt the pendulum 80 from its normal vertical position which in turn pivots the lock bar 78 upwardly to engage ratchet teeth 82 of the ratchet plate 76 so that the reel 70 is locked against rotation in the belt unwinding direction. Forward movement of the occupant relative the seat 12 imposes an occupant restraining load upon the shoulder belt 24 and the lap belt 26. The occupant restraining load acts upon the reel 70 and urges sliding movement of the reel and the retractor frame 40 in the upward direction of belt pull. Imposition of an occupant restraining load of predetermined magnitude will break away the frangible webs 64 and 66 so that the frame 40 is permitted to move upwardly and the headed studs 56 and 58 are received within the frame apertures 68 and 69 as shown in FIG. 4. This upward movement of the frame 40 moves the clamping member 84 upwardly to clamp the shoulder belt 24 and the lap belt 26 respectively between the belt clamping surfaces 92 and 94 of the clamping member 84 and the clamping surfaces 102 and 104 of the clamping abutment 96. Accordingly, the belt is clamped adjacent its point of exit from the reel 70 so that the many windings of belt on the reel will not spool-down and extend the lengths of the belt during imposition of the occupant restraining load.

Upon termination of the occupant restraining load, the frame 40 moves downwardly and the clamping member 84 is withdrawn from the clamping abutment 96 by the gravity forces acting on the retractor and by the winding effort of the reel spring retracting the belts 24 and 26. In the alternative, a spring, a manually operated lever, or other suitable means, may be provided to restore the frame 40 to the normal downward position.

While the invention has been disclosed primarily in the terms of specific embodiment shown in the drawings, it is not intended to be limited thereto but rather only to the extent set forth in the appended claims. For example, the invention may be embodied in a retractor which winds only a single belt. Furthermore, while the preferred embodiment shown herein utilizes a frangible web to position the retractor at its normal downward position, it will be understood that a spring or other suitable means may establish the retractor frame at its normal downward position and then yield upon onset of the occupant restraining load on the belt to permit upward movement of the retractor frame to initiate clamping of the belt.

Thus, it is seen that the invention provides a new and improved retractor and belt clamping therefore effective to prevent spool-down of belt from a retractor.

The embodiments of the invention in which an exclusive property or privilege is claimed are defined as follows:

1. A retractor for vehicle body occupant restraint belt comprising:
   a frame having a belt reel for winding and unwinding the restraint belt;
   means mounting the frame for limited movement on the vehicle body;
   locking means acting between the frame and the reel and selectively operable to lock the reel against belt unwinding rotation;
   a clamping member carried by the frame independently of the belt reel for limited movement with the reel and the frame;
   a clamping abutment mounted on the vehicle body in spaced relation from the clamping member and from the belt reel and cooperating with the clamping member to define a belt passage through which the belt travels during winding and unwinding from the reel; and
   yieldable means acting between the frame and vehicle body to establish the frame at a normal position spacing the clamping member from the clamping abutment to permit travel of the belt therebetween during belt winding and unwinding, said yieldable means yielding upon the occurrence of a predetermined occupant restraint load imposed on the frame subsequent to lockup of the reel by the reel locking means to permit the frame to move relative the vehicle body in the direction of belt loading and effect clamping of the belt between the clamping member and the clamping abutment to fix the length of the belt against spooling down on the reel.

2. A retractor for a vehicle body occupant restraint lap belt and shoulder belt comprising:
   a frame;
   a belt reel rotatably journaled on the frame and having both the lap belt and shoulder belt attached thereto for simultaneous winding and unwinding therefrom;

means mounting the frame for limited movement on the vehicle body;

locking means acting between the frame and the reel and selectively operable to lock the reel against belt unwinding rotation;

a clamping wedge member carried by the frame for limited movement therewith and having first and second opposed facing belt clamping surfaces thereon;

a clamping abutment means mounted on the vehicle body and having first and second belt clamping surfaces respectively facing the first and second belt clamping surfaces of the clamping wedge member in spaced relation therefrom to define a first belt passage through which the lap belt travels during winding and unwinding from the reel and a second belt passage through which the shoulder belt travels during winding and unwinding; and yieldable means acting between the frame and vehicle body and yielding upon the occurrence of a predetermined occupant restraint load imposed on the frame subsequent to lockup of the reel by the reel locking means whereby the frame moves relative the vehicle body in the direction of belt loading and effects clamping of the lap and shoulder belts respectively between the first and second clamping surfaces of the clamping wedge member and the first and second clamping surfaces of the clamping abutment to fix the length of the lap and shoulder belts against spooling down on the reel.

3. A retractor for a vehicle body occupant restraint lap belt and shoulder belt comprising:

a housing mounted on the vehicle body;

a frame slidably mounted on the housing;

yieldable means acting between the frame and the housing to establish the frame at a normal position and yielding to permit limited sliding movement of the frame relative the housing in the direction of belt pull;

a belt reel rotatably journaled on the frame and having both the lap belt and the shoulder belt attached thereto for simultaneous winding and unwinding;

a clamping abutment mounted on the housing and having first and second belt clamping surfaces facing one another and defining a passage through which the belt travels during belt winding and unwinding from the reel;

a clamping member pivotally mounted on the frame and having first and second opposed facing belt clamping surfaces facing toward the belt clamping surfaces of the clamping abutment and spaced therefrom by more than one belt thickness when the frame is established at its normal position on the housing; and locking means acting between the frame and the reel and selectively operable to lock the reel against the belt unwinding rotation so that the imposition of occupant restraint load on the lap and shoulder belts causes yielding of the yieldable means to permit movement of the frame in the direction of belt pull and effect a wedge clamping engagement of the lap and shoulder belts between the belt clamping surfaces of the clamping member carried by the frame and the mating clamping surfaces of the clamping abutment mounted on the housing.

* * * * *